(12) United States Patent
Riskin et al.

(10) Patent No.: US 9,843,169 B2
(45) Date of Patent: Dec. 12, 2017

(54) BIPOLAR IONIZER WITH EXTERNAL ION IMBALANCE INDICATOR

(71) Applicants: Yefim Riskin, Katzrin (IL); Siegfried Seibold, Yaaqov (IL)

(72) Inventors: Yefim Riskin, Katzrin (IL); Siegfried Seibold, Yaaqov (IL)

(73) Assignee: FILT AIR LTD, Zikhron Yaakov (IL)

( * ) Notice: Subject to any disclaimer, the term of this patent is extended or adjusted under 35 U.S.C. 154(b) by 422 days.

(21) Appl. No.: 14/601,557

(22) Filed: Jan. 21, 2015

(65) Prior Publication Data

US 2016/0211655 A1     Jul. 21, 2016

(51) Int. Cl.
*H01T 23/00*     (2006.01)
*F24F 3/16*      (2006.01)

(52) U.S. Cl.
CPC ........... *H01T 23/00* (2013.01); *F24F 3/16* (2013.01); *F24F 2003/1635* (2013.01); *F24F 2003/1682* (2013.01)

(58) Field of Classification Search
CPC ..... H01T 23/00; F24F 3/16; F24F 2003/1682; F24F 2003/4635
See application file for complete search history.

(56) References Cited

U.S. PATENT DOCUMENTS

| | | | |
|---|---|---|---|
| 3,711,743 A | * | 1/1973 | Bolasny ............... H01T 23/00 361/231 |
| 3,812,559 A | | 5/1974 | Spindt et al. |
| 3,853,750 A | * | 12/1974 | Volsy ................ B03C 3/019 138/37 |
| 3,909,614 A | | 9/1975 | Marshall |
| 4,096,543 A | | 6/1978 | Kozuka et al. |
| 4,227,894 A | | 10/1980 | Proynoff |
| 4,618,249 A | | 10/1986 | Minor |
| 5,381,789 A | | 1/1995 | Marquardt |
| 5,428,964 A | * | 7/1995 | Lobdell ............... F24F 11/0009 236/44 C |
| 6,785,114 B2 | | 8/2004 | Gorczyca et al. |
| 6,850,403 B1 | | 2/2005 | Gefter et al. |
| 7,031,134 B2 | | 4/2006 | Izumi et al. |
| 8,611,865 B1 | | 12/2013 | Balannik et al. |
| 8,705,224 B2 | | 4/2014 | Riskin |
| 2006/0072279 A1 | | 4/2006 | Gefter et al. |

(Continued)

FOREIGN PATENT DOCUMENTS

| | | | | |
|---|---|---|---|---|
| DE | 102009059125 | * | 7/2010 | ............ H01T 23/00 |
| JP | 3700003 | | 7/2004 | |
| RU | 2294776 | | 3/2007 | |

*Primary Examiner* — Zeev V Kitov
(74) *Attorney, Agent, or Firm* — Niels Haun; Dann, Dorfman, Herrell and Skillman, P.C.

(57) ABSTRACT

Bipolar ionizer circuit includes a high voltage AC voltage generator having a high potential output and a low potential output, the high potential output being capacitively coupled to respective high potential inputs of a pair of mutually opposite polarity voltage multipliers and the low potential output being capacitively coupled via an auxiliary capacitor to respective low potential inputs of the voltage multipliers. Outputs of the voltage multipliers are connected to respective ionizing electrodes, and an external ion imbalance indicator is connected in parallel to the auxiliary capacitor, which is thereby able to provide automatic balance of the ion current.

19 Claims, 4 Drawing Sheets

(56) References Cited

U.S. PATENT DOCUMENTS

2013/0284649 A1* 10/2013 Tucker .................. C02F 1/4674
                                                        210/139
2014/0293496 A1* 10/2014 Oldynski .................. H05F 3/06
                                                        361/213

* cited by examiner

US 9,843,169 B2

BIPOLAR IONIZER WITH EXTERNAL ION IMBALANCE INDICATOR

FIELD OF THE INVENTION

This invention relates to bipolar ion generators which use separate electrodes for generation of positive and negative ions and can be applied for industrial and domestic uses for destruction of electrostatic charges and for air disinfection.

BACKGROUND OF THE INVENTION

The most important parameters of a bipolar ionizer are the amount of positive and negative ions at the ionizer output and the balance between the concentrations of the positive and negative ions.

Usually in order to attain the required balance, a shield is positioned adjacent to the ionizing electrodes. The shield can be either passive or active. In the latter case offset voltage is applied to the shield to adjust the ion balance in the ions outflow.

Typical arrangements are shown in U.S. Pat. Nos. 3,812,559, 3,909,614, 4,096,543, 4,227,894, 4,618,249, 5,381,789, 6,785,114, 6,850,403, and 7,031,134; US 2006/0072279, RU 2294776 and JP 3700003.

A major drawback of the existing state of art is the low efficiency of the generators stemming from the use of shields. Indeed, because of the proximity of the shield vicinity to the ionizing electrodes, 90-95% of the ion current arrives at the shield, while only 5 to 10% of the current escapes the ionizer and reaches the open air. The drawback results in low accuracy of the opposite polarity ions control outside the ionizer. For example, an imbalance of 10% in the output ion current results in an imbalance of as little as 1% in the overall ion current.

In principle this has a strong impact on the use of such ionizers since it is the user who experiences the conditions for imbalance which results from the installation and the changing conditions of operation.

U.S. Pat. No. 8,705,224 in the name of the present inventor discloses a method for generating ions that includes generating AC high voltage using a stationary AC generator, applying the AC high voltage to one or more AC/DC voltage converters via capacitive air coupling between a high voltage terminal of the AC generator and one or more high voltage terminals of the AC/DC voltage converters. The AC/DC voltage converters are rotated, and each AC/DC voltage converter is connected to an air ionizing electrode that rotates with the AC/DC voltage converter it is connected to when that AC/DC voltage converter is rotated, relative to the AC generator, in an air flow. Additional capacitive air coupling is provided between a low voltage terminal of the AC generator and one or more low voltage terminals of the AC/DC voltage converters.

U.S. Pat. No. 8,611,865 in the name of the present inventor discloses a method and a device for automatic positive and negative ion balance control in a bipolar ion generator. A bias voltage from a bias voltage source is applied to a bias electrode from a power supply that includes an AC voltage generator and a voltage multiplying circuit of at least one cascade. The bias current flowing through the bias electrode may be controlled by charging a capacitor in the voltage multiplying circuit so as stabilize the bias current.

SUMMARY OF THE INVENTION

An object of the present invention is to improve efficiency of bipolar ionizers and to provide an indication of positive and negative ion imbalance in the outflow.

The object is achieved by using a circuit that provides the balance of positive and negative ions sparing the use of a shield.

Automatic balance of ions flow is achieved through the use of two opposite polarity voltage multiplying circuits fed from a single high voltage AC generator having high and low potential outputs. The high potential generator output is capacitively coupled to the high voltage inputs of opposite polarity voltage multipliers, while the low potential output of the generator is coupled via an auxiliary capacitor to the low potential inputs of the voltage multipliers. The opposite polarity outputs of the voltage multipliers are connected to the ionizing electrodes. An indicator is connected in parallel to the auxiliary capacitor in order to control the ion imbalance.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
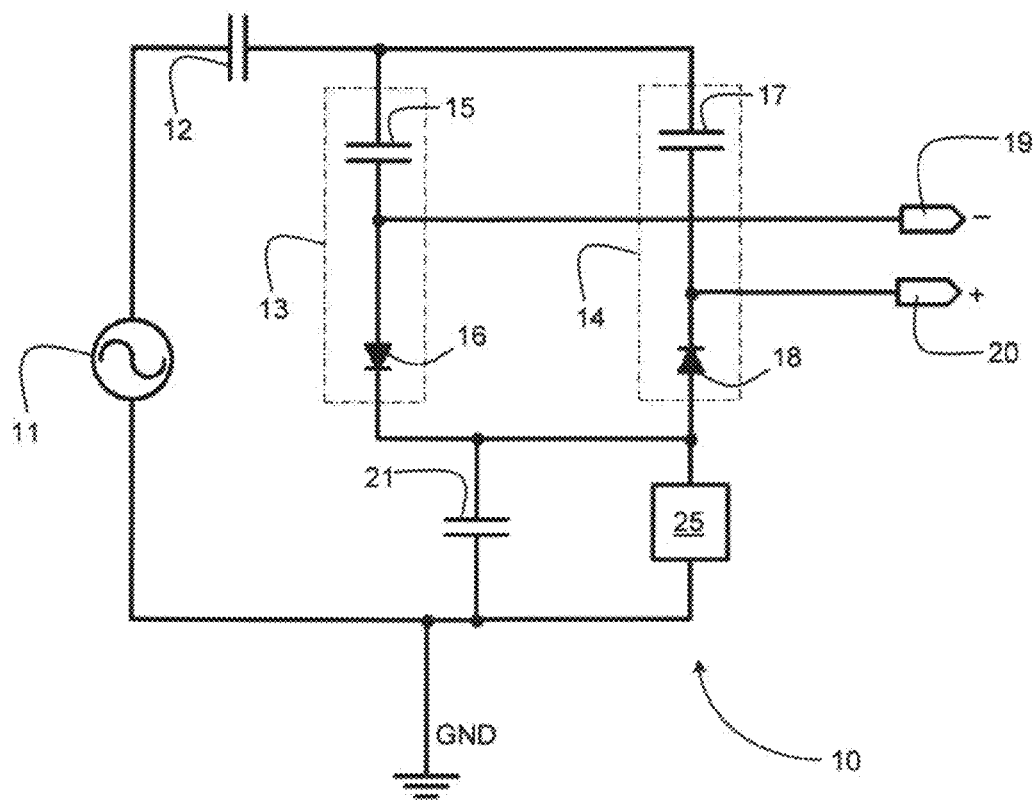
FIG. 1 shows schematically a bipolar ionizer circuit according to an embodiment of the invention.

FIG. 1 shows schematically a bipolar ionizer circuit 10 comprising a high voltage AC voltage generator 11 whose high potential output is connected via a first capacitor 12 to the respective high voltage inputs of a pair of negative and positive voltage multiplier 13 and 14 and whose low potential output is connected to GND. The negative voltage multiplier 13 comprises a second capacitor 15 connected to the anode of a first rectifier diode 16. The positive voltage multiplier 14 comprises a third capacitor 17 connected to the cathode of a second rectifier diode 18 whose anode is coupled to the cathode of the first rectifier diode 16. A low voltage ionizing electrode 19 is connected to the anode of the first rectifier diode 16 and a high voltage ionizing electrode 20 is connected to the cathode of the second rectifier diode 18. The common connection of the second and third capacitors 15 and 17 constitutes the high potential inputs of the two voltage multipliers. The common connection of the respective first and second rectifiers constitutes the low potential inputs of the two voltage multipliers and is coupled to GND via a fourth capacitor 21 (constituting an auxiliary capacitor) across which is connected an external ion imbalance indicator 25, which will now be described in more detail with respect to FIG. 2.

Figure 2:
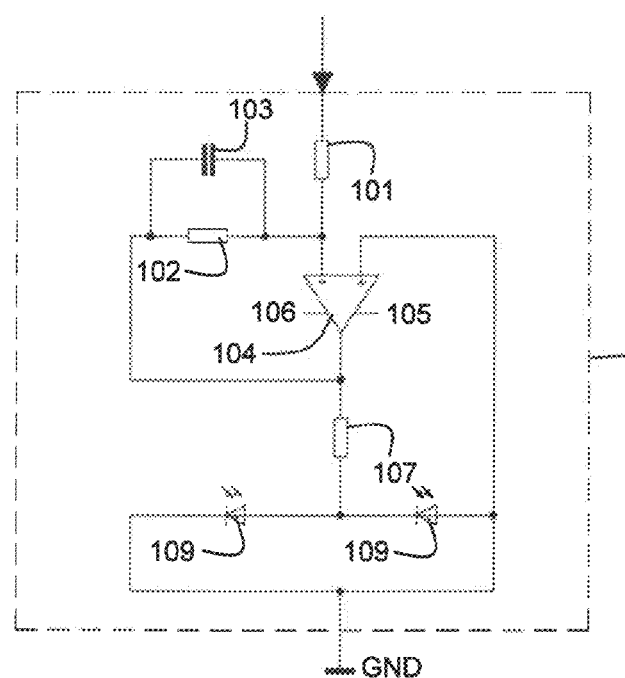
FIG. 2 shows schematically an external ion imbalance indicator for use with the bipolar ionizer circuit of FIG. 1.

Thus, referring to FIG. 2, the external imbalance indicator 25 includes an input resistor 101 connected to the inverting input of an OP AMP 104 having positive and negative DC supply connections 105, 106. Connected across the inverting input of the OP AMP 104 and its output is a feedback resistor 102 in parallel with an integrating capacitor 103. One end of a limiting resistor 107 is connected to the output of the OP AMP 104, its other end being commonly connected to cathode of a first LED 108 and to the anode of a second LED 109 whose cathode is commonly connected to the anode of the first LED 108 and to the non-inverting input of the OP AMP 104, which is also connected to GND.

Operation of the ionizer is as follows. The AC high voltage is converted by the opposite polarity voltage multipliers 13 and 14 to pulsating positive and negative voltage, which is applied to the ionizing electrodes 19 and 20, spaced somewhat apart in the ionizer body 31 (shown in FIG. 3), so that negative and positive ion flows are generated.

Since the ion currents in the low potential circuit constituted by the fourth capacitor 21 and the external imbalance indicator 25 flow in opposite directions, the fourth capacitor 21 provides automatic balance of the ion current with respect to the alternating current, while the indicator 25 with sufficiently high input resistance functions as an imbalance sensor with respect to the direct current.

Also, since constant conditions of ion generation are maintained inside the ionizer, including the layout of all the electronic components and the casing 31, the imbalance indication circuit 25 will respond only to the ion generation changes occurring outside the generator, thus constituting an indicator of the external ion imbalance.

The indicator 25 is a bipolar integrating circuit with a fixed indication threshold that is determined by the direct voltage drop across the LEDs 108 and 109 (2-2.5 V) at an amplifier amplification factor equal to 1. Sensitivity of the external imbalance indicator 25 can be changed by adjusting the amplification factor by means of the feedback resistor 102. Adjustment of the indicator sensitivity is required in order to neglect incidental or minor fluctuations in ion balance.

Figure 3:
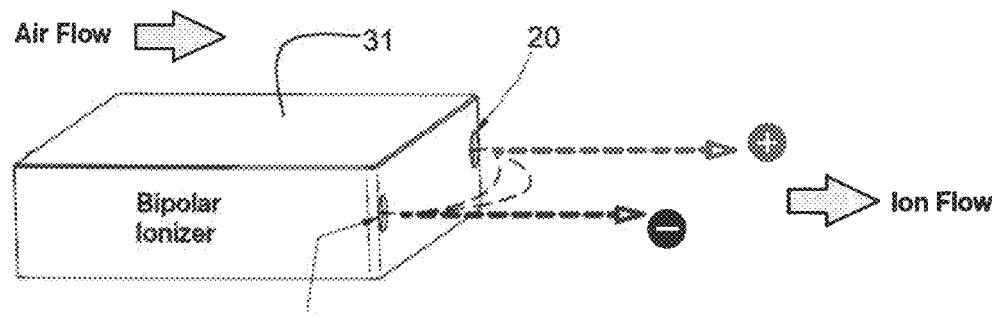
FIG. 3 shows pictorially correct disposition of a bipolar ionizer according to the invention relative to air flow.

FIG. 3 shows pictorially the preferred disposition of a bipolar ionizer 30 according to the invention wherein the ionizing electrodes 19 and 20 are mounted in an end surface of a casing 31, which houses the circuits described above with reference to FIGS. 1 and 2 and is disposed relative to air flow such that the ion flow is parallel to the air flow.

A prototype of the ionizer 30 according to the invention has the following specifications:

| 1. | Distance between the electrodes | 40 mm |
| --- | --- | --- |
| 2. | Air flow rate | 3 m/sec |
| 3. | Ion output | $10^{12}$ ion/sec |
| 4. | Efficiency | 70% |
| 5. | Imbalance indicator sensitivity | ±2% |

The bipolar ionizer according to the invention is characterized by the features that the ion current flow and the air flow are parallel and that any ion imbalance is corrected automatically. It has been found by the Applicant that these properties lend themselves to a number of particularly advantageous uses some of which will now be described.

Figure 4:
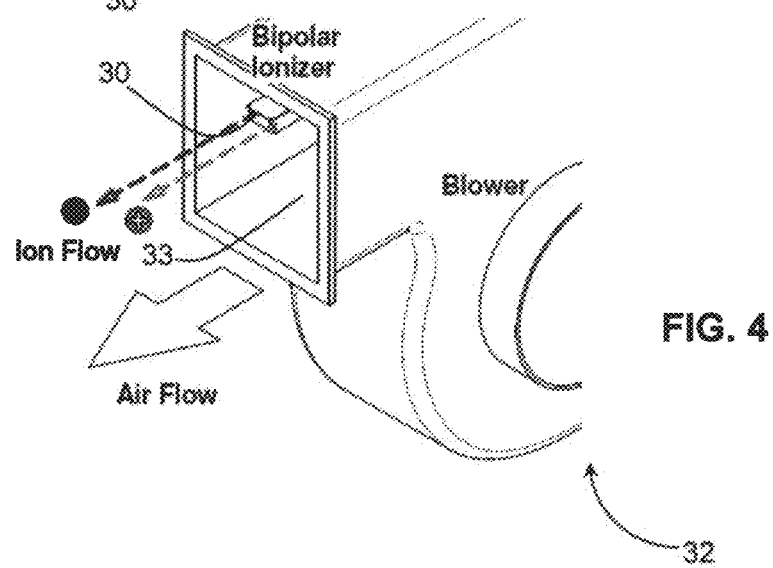
FIG. 4 shows pictorially use of the bipolar ionizer according to the invention in an air duct.

FIG. 4 shows pictorially a blower depicted generally as 32 having an air duct 33 in or toward whose opening is mounted a bipolar ionizer 30 according to the invention such that the ion flow is parallel to the air flow. Such an arrangement may also be part of an air showers, which are self-contained chambers installed at entrances to controlled environments such as clean rooms.

Figure 5:
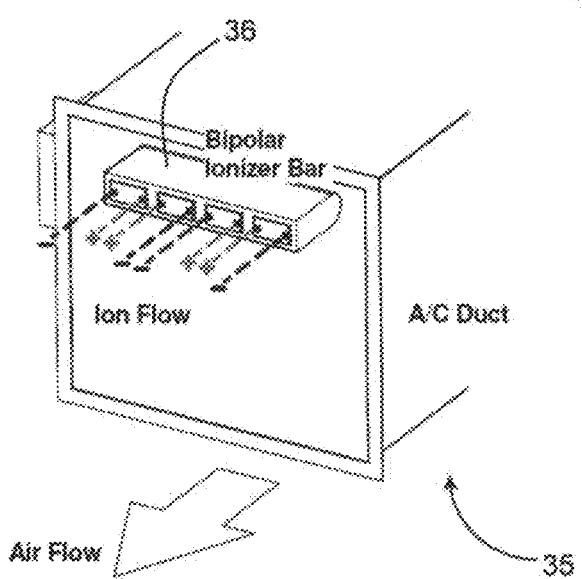
FIG. 5 shows pictorially a bipolar ionizer bar comprising multiple ionizers.

FIG. 5 shows pictorially an air conditioning duct 35 in which is mounted a bipolar ionizer bar 36 comprising multiple ionizers 30 according to the invention. Each adjacent pair of ionizers is oriented such that adjacent electrodes are always of the same polarity in order to avoid recombination of ions. Some ion recombination between the positive and negative electrodes of a single module is inevitable. This is reduced by spacing the positive and negative electrodes as far as possible from each other, which in practice means mounting them as close as possible to opposite edges of the housing.

Figure 6:
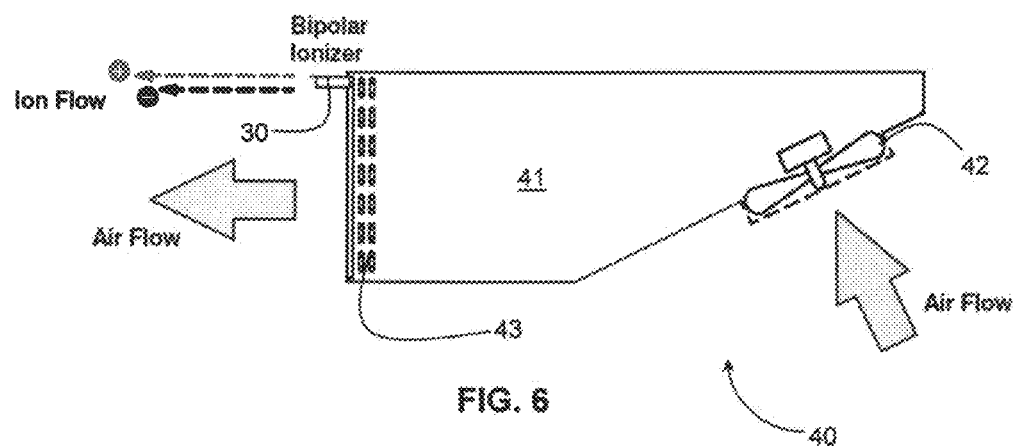
FIG. 6 shows pictorially an assembly comprising a bipolar ionizer bar and a blower for use in a container or cold room.

FIG. 6 shows pictorially an assembly 40 for decontaminating air in a container or cold room. The assembly 40 includes a casing 41 having at one end an opening supporting a blower 42 and having at its opposite end an opening in or towards the end of which there is mounted a bipolar ionizer 30 according to the invention such that the ion flow is parallel to the air flow. Such an arrangement may also be part of an air curtain, which is a fan-powered device used for separating two spaces from each other. In such case, the heater exchanger 43 is not required.

Figure 7:
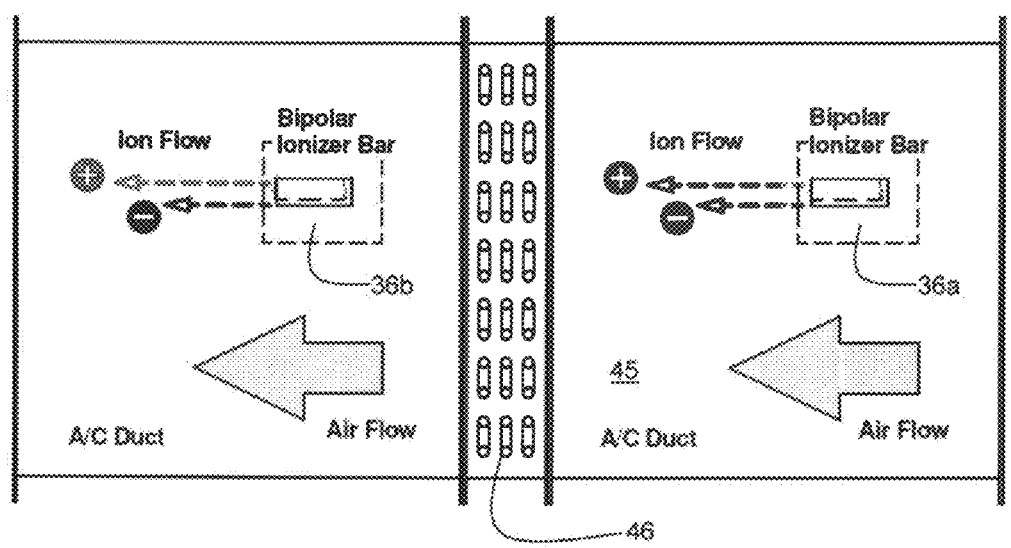
FIG. 7 shows pictorially use of upstream and downstream ionizers in an air-conditioning duct on opposite sides of the heat exchange coil.

FIG. 7 shows pictorially use of upstream and downstream ionizers in the form of bipolar ionizer bars 36a and 36b, respectively, disposed in an air-conditioning (A/C) duct 45 on opposite sides of the heat exchange coil 46. When used as an air-conditioner to cool air, the heat exchange coil 46 is a cooling coil and the downstream air is colder than the upstream air. The colder air is able to hold less water than the upstream air and the water content that is thus condensed collects around the cooling coil, making it moist and thereby a bacteria trap. The upstream ionizers 36a decontaminate the air prior to its reaching the cooling coil 46 in order to prevent the collection of bacteria on the cooling coil 46. However, the cooling coil 46 deionizes the air and therefore the downstream ionizers 36b are required to replace the ions removed by the cooling coil 46.

Figure 8:
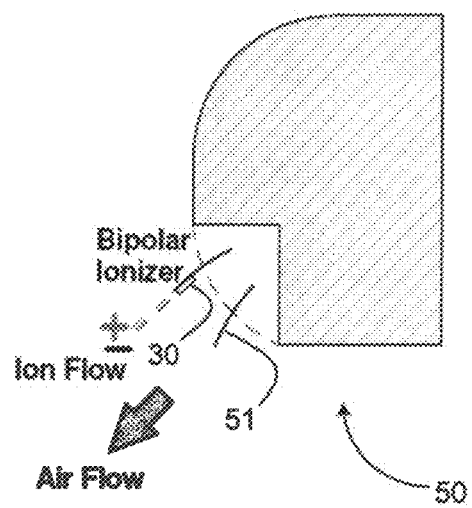
FIGS. 8 and 9 show pictorially use of the bipolar ionizer on a wall-mounted air-conditioning unit.
Figure 9:
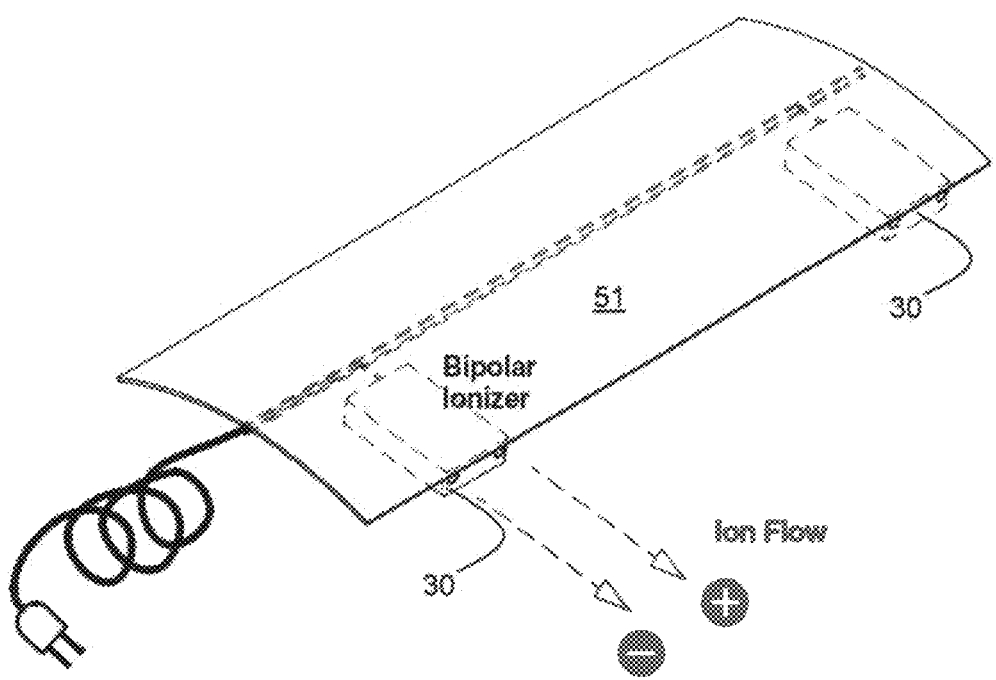

FIGS. 8 and 9 show pictorially use of the bipolar ionizer on a wall-mounted air-conditioning unit 50 having one or more flaps 51 that swing up and down to direct the air at varying angles rather than direct it in one fixed direction only. Bipolar ionizers 30 according to the invention are mounted on the flaps 51. In FIG. 9 there are shown two bipolar ionizers 30 at opposite sides of the flap, but obviously different numbers of ionizers may be employed according to need.

In all the embodiments, the ionizers are preferably mounted in a duct through which air is forced in a known direction with the ionizing electrodes in the ionizer body so disposed that the ion current and the air flow vectors are in the same direction. This is rendered possible according to the invention owing to the layout of electrodes 19 and 20 which provides the best fit of the ion current and the air flow vector directions. Maximal efficiency is achieved when the vectors are parallel.

It should be noted that the configurations shown in FIGS. 4 to 9 exploit the above-mentioned properties of the bipolar ionizer that the ion current flow and the air flow are parallel and that any ion imbalance is corrected automatically. However, they do not require that the bipolar ionizer be identical to that described with reference to FIGS. 1 and 2, so long as these properties are achieved.

The invention claimed is:

1. A bipolar ionizer circuit comprising:
a high voltage AC voltage generator having a high potential output and a low potential output, the high potential output being capacitively coupled to respective high potential inputs of a pair of mutually opposite polarity voltage multipliers and the low potential output being capacitively coupled via an auxiliary capacitor to respective low potential inputs of the voltage multipliers, wherein the auxiliary capacitor is commonly coupled to respective low potential inputs of the two voltage multipliers and provides automatic balance of the ion current with respect to alternating current,
the outputs of the voltage multipliers being connected to respective ionizing electrodes, and
an external ion imbalance indicator being connected in parallel to the auxiliary capacitor.

2. The bipolar ionizer circuit according to claim 1, wherein the external ion imbalance indicator is a bipolar integrating circuit with a fixed indication threshold that is determined by a DC voltage drop across an output thereof at unity gain.

3. The bipolar ionizer circuit according to claim 2, comprising:
an input resistor connected to the inverting input of an OP AMP having an inverting input and a non-inverting input and positive and negative DC supply connections,
a feedback resistor in parallel with an integrating capacitor connected across the inverting input and an output of the OP AMP,
a first end of a limiting resistor connected to the output of the OP AMP, and
a second end of the limiting resistor being commonly connected to cathode of a first LED and to the anode of a second LED whose cathode is commonly connected to the anode of the first LED and to the non-inverting input of the OP AMP, which is also connected to GND.

4. The bipolar ionizer circuit according to claim 3, wherein sensitivity of the external imbalance indicator is adjustable by adjusting the gain of the OP AMP by means of the feedback resistor.

5. The bipolar ionizer circuit according to claim 1, wherein the auxiliary capacitor provides automatic balance of the ion current.

6. A bipolar ionizer comprising a casing, which houses the bipolar ionizer circuit according to claim 1, wherein the ionizing electrodes are mounted in an end surface of the casing and are disposed relative to air flow such that the ion flow is in a predetermined direction relative to the air flow.

7. The bipolar ionizer according to claim 6, wherein the ionizing electrodes are mounted within the casing so that the ion flow is parallel to the air flow.

8. The bipolar ionizer according to claim 6 mounted in or toward an opening of an air duct coupled to a blower that is configured to force air through the duct such that ions generated by bipolar ionizer flow through the duct in a direction that is parallel to air flow.

9. A bipolar ionizer bar comprising multiple mutually adjacent pairs of bipolar ionizers according to claim 6.

10. The bipolar ionizer bar according to claim 9, wherein each adjacent pair of ionizers is oriented such that adjacent electrodes are of the same polarity.

11. An assembly for decontaminating air in a container or cold room, said assembly including a casing having at one end an opening supporting a blower and having at its opposite end an opening in or towards an end of which there is mounted a bipolar ionizer that is configured to provide automatic balance of the ion current without requiring a reference electrode to be disposed external to the bipolar ionizers in a path of the ion current generated thereby and that is mounted within said opening such that the ion flow is parallel to the air flow.

12. An air-conditioning duct configured to convey air from an upstream end to a downstream end through a heat exchange coil, there being mounted in said duct toward the upstream end, upstream bipolar ionizers for decontaminating the air prior to its reaching the heat exchange coil in order to prevent collection of bacteria on the heat exchange coil, wherein the upstream bipolar ionizers are configured to provide automatic balance of the ion current without requiring a reference electrode to be disposed external to the bipolar ionizers in a path of the ion current generated thereby and are mounted within said duct such that the ion flow is parallel to the air flow.

13. The air-conditioning duct according to claim 12, further comprising downstream bipolar ionizers mounted toward the downstream end for replacing ions removed by the heat exchange coil.

14. A wall-mounted air-conditioning unit having one or more flaps configured to swing up and down to direct air at varying angles and at least one bipolar ionizer mounted on at least one of the flaps, wherein the at least one bipolar ionizers is configured to provide automatic balance of the ion current without requiring a reference electrode to be disposed external to the bipolar ionizers in a path of the ion current generated thereby and is mounted such that the ion flow is parallel to the air flow.

15. The wall-mounted air-conditioning unit according to claim 14, comprising at least two bipolar ionizers each at respective opposite sides of the flap.

16. A bipolar ionizer circuit comprising:
a high voltage AC voltage generator having a high potential output and a low potential output, the high potential output being capacitively coupled to respective high potential inputs of a pair of mutually opposite polarity voltage multipliers and the low potential output being capacitively coupled via an auxiliary capacitor to respective low potential inputs of the voltage multipliers,
the outputs of the voltage multipliers being connected to respective ionizing electrodes,
an external ion imbalance indicator being connected in parallel to the auxiliary capacitor and being a bipolar integrating circuit with a fixed indication threshold that is determined by a DC voltage drop across an output thereof at unity gain,
an input resistor connected to the inverting input of an OP AMP having an inverting input and a non-inverting input and positive and negative DC supply connections,
a feedback resistor in parallel with an integrating capacitor connected across the inverting input and an output of the OP AMP,
a first end of a limiting resistor connected to the output of the OP AMP, and a second end of the limiting resistor being commonly connected to cathode of a first LED and to the anode of a second LED whose cathode is commonly connected to the anode of the first LED and to the non-inverting input of the OP AMP, which is also connected to GND.

17. The bipolar ionizer circuit according to claim 16, wherein sensitivity of the external imbalance indicator is adjustable by adjusting the gain of the OP AMP by means of the feedback resistor.

18. A wall-mounted air-conditioning unit having one or more flaps configured to swing up and down to direct air at varying angles and at least two bipolar ionizers each mounted at respective opposite sides on at least one of the flaps, wherein the at least one bipolar ionizers is configured to provide automatic balance of the ion current and is mounted such that the ion flow is parallel to the air flow.

19. A wall-mounted air-conditioning unit having one or more flaps configured to swing up and down to direct air at varying angles and at least one bipolar ionizer bar comprising multiple mutually adjacent pairs of bipolar ionizers mounted on at least one of the flaps, wherein the bipolar ionizers are configured to provide automatic balance of the ion current without requiring a reference electrode to be disposed external to the bipolar ionizers in a path of the ion current generated thereby and are mounted such that the ion flow is parallel to the air flow.

\* \* \* \* \*